United States Patent [19]
Horiki et al.

[11] Patent Number: 4,868,045
[45] Date of Patent: Sep. 19, 1989

[54] MASKING MEMBER

[75] Inventors: Seinosuke Horiki; Reiji Makino; Kuninori Ito; Tetuji Unno, all of Tokai, Japan

[73] Assignee: Nagoya Oilchemical Co., Ltd., Aichi, Japan

[21] Appl. No.: 272,723

[22] Filed: Nov. 17, 1988

Related U.S. Application Data

[63] Continuation-in-part of Ser. No. 1,822, Jan. 8, 1987, abandoned.

[51] Int. Cl.$^4$ ............................. B32B 3/26; B32B 7/00
[52] U.S. Cl. ................................... 428/314.4; 428/40; 428/317.3; 428/317.7; 428/343; 428/355
[58] Field of Search ..................... 428/40, 314.4, 317.1, 428/317.3, 317.7, 343, 355, 492

[56] References Cited

U.S. PATENT DOCUMENTS 3,619,344 11/1971 Wolinski et el. .................. 428/317.7
4,061,825 12/1977 Counsell et al. ..................... 428/355
4,226,915 10/1980 Iijima et al. .......................... 428/492
4,393,080 7/1983 Powelchak et al. ................ 428/355

Primary Examiner—William J. Van Balen
Attorney, Agent, or Firm—Cooper & Dunham

[57] ABSTRACT

A new masking member consisting essentially of a molded foamed closed cell polystyrene base having a density from about 12.5 to about 50 g/l and an adhesive layer formed on a surface of said polystrene base by coating said surface of said base with a composition consisting essentially of an emulsion-type adhesive in which a water-soluble polymer is mixed in an amount in the range from about 0.1 to about 20% by weight of the weight of said emulsion-type adhesive, is provided in the instant invention. Said masking member is used to protect a surface of an article from a surface treatment, and is attached to a part of the surface of the article by its adhesive layer. Said adhesive layer of the masking member has a suitable stickiness, an excellent weatherability, an excellent heat resistance and a large cohesive force which prevents the adhesive layer from transferring from the masking member to the part of the surface of the article.

6 Claims, No Drawings

MASKING MEMBER

This application is a continuation-in-part of application Ser. No. 001,822, filed Jan. 8, 1987, abandoned.

FIELD OF THE INVENTION

The instant invention relates to a new masking member used to protect a surface of an article from a surface treatment. More particularly, the instant invention relates to a masking member consisting essentially of a molded foamed closed cell polystyrene base having a density from about 12.5 to about 50 g/l and adhesive layer formed on a surface of said polystyrene base by coating said surface of said base with a composition consisting essentially of an emulsion-type adhesive in which a water-soluble polymer is mixed in an amount in the range from about 0.1 to about 20% by weight of the weight of said emulsion-type adhesive.

DESCRIPTION OF THE PRIOR ART

Hitherto, a masking member comprising a base and an adhesive layer has been provided to protect a surface of an article from a surface treatment. Said masking member is attached to a part of the surface of the article by its adhesive layer. It is necessary to prevent said adhesive layer from transferring from the masking member to said part of the surface of the article. To achieve this, hitherto said adhesive layer has been slightly cross-linked to give a large cohesive force or a release agent has been mixed to the adhesive layer to prevent sticking to the surface of the article. Nevertheless, controll of degree of cross-linking in the adhesive layer is very delicate and if the degree of cross-linking is little higher than the proper degree, the stickiness of the adhesive layer is remarkable decreased, while said transferring of said adhesive layer can not be completely prevented if the degree of cross-linking is little lower than the proper degree. Further, mixing the release agent in the adhesive layer may bring about a deterioration of stickiness, weatherability, heat resistance and the like.

SUMMARY OF THE INVENTION

Accordingly, an object of the instant invention is to prevent the adhesive layer of the masking member from transferring to the surface of the article.

A further object of the instant invention is to provide the adhesive layer having a suitable stickiness.

Still a further object of the instant invention is to provide the adhesive layer having an excellent weatherability and an excellent heat resistance.

Briefly, said objects of the instant invention can be attained by a new masking member consisting essentially of a molded foamed closed cell polystyrene base having a density from about 12.5 to about 50 g/l and an adhesive layer formed on a surface of said polystyrene base by coating said surface of said base with a composition consisting essentially of an emulsion-type adhesive in which a water-soluble polymer is mixed in an amount in the range from about 0.1 to about 20% by weight of the weight of said emulsion-type adhesive. Said water-soluble polymer in said emulsion-type adhesive may increase the cohesive force of the adhesive and at the same time give the adhesive a releasing property. Since the water-soluble polymer does not soften even at high temperature, the cohesive force of the adhesive does not decrease in high temperature, and the water-soluble polymer does not deteriorate stickiness and weatherability of the adhesive.

DETAILED DESCRIPTION

The new masking member of the instant invention consists essentially of a molded foamed closed cell polystyrene base and an adhesive layer formed on a surface of said polystyrene base by coating said surface of said base with a composition consisting essentially of an emulsiontype adhesive in which a water-soluble polymer is mixed.

Said base used in the instant invention consists of a molded foamed closed cell polystyrene and should have a density from about 12.5 to about 50 g/l.

The adhesive used in the instant invention should be an emulsion-type since a water-soluble polymer can be dissolved and uniformly mixed in the emulsion. Said adhesive may be a rubber latex such as a natural rubber latex, a styrene-butadiene rubber latex, a styrene-butadiene block copolymer latex, a styrene-isoprene block copolymer latex, acrylonitrile-butadiene rubber latex, an isoprene rubber latex, a chloroprene rubber latex, a butyl rubber latex, a polyisobutylene rubber latex, a polybutene rubber latex, a graft rubber latex, and the like; a synthetic resin emulsion such as an acrylic resin emulsion, a methacrylic resin emulsion, a vinylacetate resin emulsion, a vinyl propionate resin emulsion, a vinyl acetate-ethylene copolymer emulsion, a vinyl acetate-maleic acid copolymer emulsion, a styrene resin emulsion, a vinyl chloride resin emulsion, a vinyl chloride-ethylene copolymer emulsion, a vinyl chloride-vinyl acetate copolymer emulsion, a vinylidene chloride resin emulsion, a vinyl ether resin emulsion and the like. Said rubber latex or said synthetic resin emulsion should have stickiness at room temperature and more than two kinds of said rubber latex and said synthetic resin may be mixed, and in this case the resulting mixture should have stickiness and it may not always be necessary that the rubber latex or the synthetic resin emulsion as a component should have stickiness at room temperature. And also dibutylphthalate, dioctylphthalate, tricresylphosphate or terpenedimer as the plasticizer or the softening agent may be mixed in the said latex or said emulsion. And in this case also, the resulting mixture should have stickiness and it may not aways be necessary that the rubber latex or the synthetic emulsion as a component should individually have stickiness at room temperature.

A rosin, a rosin derivative, a petroleum resin, a cumarone resin, a terpene resin, a phenol resin, an alkyl phenol resin and the like as a stickifier, a toluene, xylene, ethylacetate, n-butyl acetate, methyl-ethyl ketone, methylisobutyl ketone, cellosolve acetate, n-butyl cellosolve, ethylene glycol, diethylene glycol, propylene glycol, glycerine, polyethylene glycol, polypropylene glycol, and the like as the organic solvent or the wetting agent, talc, bentnite, calcium carbonate, and the like as the filter and the like may be mixed in the adhesive of the instant invention.

The water-soluble polymer used in the instant invention may includes all kinds of known water-soluble polymer such as glue, gelatine, casein, starch, modified starch, dextrin, gum Arabic, sodium alginate, polyvinyl alcohol, carboxy methyl cellulose, methyl cellulose, hydroxyethyl cellulose, polysodium acrylate, polysodium methacrylate, polyacrylamide, polymetacrylamide, polyvinylmethyl ether, vinyl acetate-maleic acid copolymer, styrene-maleic acid copolymer, isobutylene-maleic acid copolymer, polyvinyl pyrrolidone, partially saponified polyacrylate, and the like.

The adding amount of said water-soluble polymer should be about 0.1 to about 20% by weight and desirably about 0.1 to about 10% by weight. In case that the adding amount of said water-soluble polymer is more than 20 weight %, the stickiness of the adhesive tends to decrease. In case that the adding amount of said water-soluble polymer is less than 0.1 weight %, it may be difficult to prevent the adhesive from transferring to the surface of the article. Ordinary, the water-soluble emulsion is added to the emulsion-type adhesive after said emulsion-type adhesive has been produced, however the water-soluble emulsion may also be added to the water which is used for the emulsion before the emulsion-type adhesive is produced (polymerized or emulsified). Further, the water soluble emulsion is added to the emulsion-type adhesive in the form of powder or flakes, or the aqueous solution, and the like.

As above described, the density of the foamed closed cell polystyrene base should be in the range from about 12.5 to about 50 g/l in combination with the above described emulsion type adhesive. The reason of said limitation about the density is as follows.

Usually, the hook is used to remove the masking member from a part of a surface of an article on which the masking member has been attached. Easiness of removal of the msking member is very significant for smooth proceeding of the surface treatment process and said easiness depend on easiness of hooking and the mechanical strength of the masking member. If the hook is not smoothly stick into the masking member or the masking member is broken when the masking member is removed, proceeding of the surface treatment process, especially proceeding of the continuous surface treatment in the mass production may be much obstructed. If the density of the foamed closed cell polystyrene base of the masking member is more than about 50 g/l, the mechanical strength of the masking member may be too high for smooth hooking and if the density of the foamed closed cell polystyrene base of the masking member is less than about 12.5 g/l, the masking member may be broken by the bonding strength of the adhesive layer foamed on the surface of the polystyrene base by coating said surface of said base with a composition consisting essentially of the emulsion type adhesive in which the water-soluble polymer is mixed in an amount in the range from about 0.1 to about 20% by weight of the weight of said emulsion-type adhesive.

To manufacture the masking member of the instant invention, the emulsion-type adhesive may be coated on a surface of the base which is to be contacted to the surface of the article to be covered and if desired said coating layer of the emulsion-type adhesive may be dried by heating to form the adhesive layer. The weight of the adhesive layer may commonly be about 50 to about 100 g/m².

EXAMPLE 1

Seventy weight parts of a natural rubber latex (50 weight % of solid content) and 50 weight parts of an emulsion of a terpene resin were mixed together and two kinds of the water-soluble polymer were respectively mixed in said mixture as shown in Table 1.

| Component | Adhesive No. | | | | | | | | | | |
|---|---|---|---|---|---|---|---|---|---|---|---|
| | 1 | 2 | 3 | 4 | 5 | 6 | 7 | 8 | 9 | 10 | 11 |
| Emulsion-type adhesive | 100 | 100 | 100 | 100 | 100 | 100 | 100 | 100 | 100 | 100 | 100 |
| Polysodium styrene sulfonate | — | 0.01 | 0.05 | 5 | 10 | 20 | — | — | — | — | — |
| Gelatin | — | — | — | — | — | — | 0.01 | 0.05 | 5 | 10 | 20 |

Table 1 (weight parts)

The resulting emulsion-type adhesives were respectively coated on a surface of a foamed closed cell polystyrene panel whose density is 30 g/l as a base in amount of 50 g/m² and said adhesive layer was dried to manufacture a masking member. The results of the tests of said masking member are shown in Table 2.

TABLE 2

| Test item | | Adhesive No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| (1) Peeling strength g/25 mm | | 300 | 300 | 300 | 290 | 280 | 160 | 300 | 300 | 290 | 280 | 160 |
| (2) Transfer of adhesive (at room temperature) | 1 day after | X | Δ | O | O | O | O | Δ | O | O | O | O |
| | 30 days after | X | Δ | O | O | O | O | Δ | O | O | O | O |
| (3) Transfer of adhesives (at 80° C.) | | X | X | O | O | O | O | X | O | O | O | O |

(1) Peeling strength: the masking member was attached to the surface of the steel panel coated with paint by contacting with the adhesive layer of the masking member, and after one day, peeling strength (180° C.) was measured at 20° C.

(2) Transfer of adhesive (at room temperature): the masking member was attached to the surface of the steel panel coated with paint by contacting with the adhesive layer of the masking member, and said test piece was kept at 20° C. for one day or at room temperature for 30 days. Then, the masking member was peeled from the steel panel and transfer of the adhesive to the steel panel was observed.

(3) Transfer of adhesive (at 80° C.): the masking member was attached to the surface of the steel panel coated with paint by contacting with the adhesive layer of the masking member and said test piece was kept at room temperature for one day and then at 80° C. for 1 hour. Then the masking member was peeled from the steel panel and transfer of the adhesive to the steel panel was observed.

○ : no transfer
◎ : slight transfer
Δ : fair transfer
X : remarkable transfer

EXAMPLE 2

Two kinds of the water-soluble polymer were respectively mixed in the emulsion of the copolymer consisting of 70 weight parts of n-butyl acrylate and 30 weight parts of vinylacetate(50 weight % of solid content) as shown in Table 3.

TABLE 3

| | | | | | Adhesive No. | | | | | | | (weight part) |
|---|---|---|---|---|---|---|---|---|---|---|---|---|
| Component | 12 | 13 | 14 | 15 | 16 | 17 | 18 | 19 | 20 | 21 | 22 | |
| Emulsion-type adhesive | 100 | 100 | 100 | 100 | 100 | 100 | 100 | 100 | 100 | 100 | 100 | |
| Polyvinyl alcohol | — | 0.01 | 0.05 | 5 | 10 | 20 | — | — | — | — | — | |
| Sodium alginate | — | — | — | — | — | — | 0.01 | 0.05 | 5 | 10 | 20 | |

The resulting emulsion-type adhesives were respectively coated on a surface of a foamed closed cell polystyrene panel whose density is 30 g/l as a base in amount of 50 g/m² and said adhesive layer was dried to manufacture a masking member. The results of the tests of said masking member are shown in Table 4.

TABLE 4

| Test item | | Adhesive No. | | | | | | | | | | |
|---|---|---|---|---|---|---|---|---|---|---|---|---|
| | | 12 | 13 | 14 | 15 | 16 | 17 | 18 | 19 | 20 | 21 | 22 |
| (1) Peeling strength g/25 mm | | 400 | 400 | 400 | 395 | 390 | 200 | 400 | 400 | 390 | 380 | 180 |
| (2) Transfer of adhesive (at room temperature | 1 day after | X | Δ | ○ | ◎ | ◎ | ◎ | Δ | ◎ | ◎ | ◎ | ◎ |
| | 30 days after | X | Δ | ◎ | ◎ | ◎ | ◎ | Δ | ◎ | ◎ | ◎ | ◎ |
| (3) Transfer of adhesives (at 80° C.) | | X | X | ○ | ◎ | ◎ | ◎ | X | ○ | ◎ | ◎ | ◎ |

(4) Peeling strength: the masking member was attached to the surface of the aluminum panel by contacting with the adhesive layer of the masking member, and after one day, peeling strength (180°) was measured at 20° C.

(5) Transfer of adhesive (at room temperature): the masking member was attached to the surface of the aluminum panel coated with paint by contacting with the adhesive layer of the masking member, and said test piece was kept at 20° C. for one day or at room temperature for 30 days. Then, the masking member was peeled from the aluminum panel and transfer of the adhesive to the aluminum panel was observed.

(6) Transfer of adhesive (at 80° C.): the masking member was attached to the surface of the aluminum panel by contact with the adhesive layer of the masking member and said test piece was kept at room temperature for one day and then at 80° C. for 1 hour. Then, the masking member was peeled from the aluminum panel and transfer of the adhesive to the aluminum panel was observed.

○ : no transfer
◎ : slight transfer
Δ : fair transfer
X : remarkable transfer

EXAMPLE 3

Ten weight parts of a rosin emulsion (60 weight % of solid content) was added to 90 weight parts of a emulsion of copolymer consisting of 50 weight parts of ethylacrylate and 50 weight parts of methylmethacrylate (50 weight parts of solid content), and 51 weight % of emulsion of copolymer was obtained. Two kinds of water-soluble polymer were respectively mixed in 100 weight parts of said emulsion as shown in Table 5.

TABLE 5

| | | | | Adhesive No. | | | | | | | (weight part) |
|---|---|---|---|---|---|---|---|---|---|---|---|---|
| Component | 23 | 24 | 25 | 26 | 27 | 28 | 29 | 30 | 31 | 32 | 33 | |
| Emulsion-type adhesive | 100 | 100 | 100 | 100 | 100 | 100 | 100 | 100 | 100 | 100 | 100 | |
| Polysodium acrylate | — | 0.01 | 0.055 | 5 | 11 | 20 | — | — | — | — | — | |
| Polyethylene oxide | — | — | — | — | — | — | 0.01 | 0.055 | 5 | 11 | 20 | |

The resulting emulsion-type adhesives were respectively coated on a surface of the craft paper as a base in amount of 50 g/m² and said adhesive layer was dried to manufacture a masking member. The results of the tests of said masking member are shown in Table 6.

TABLE 6

| | Adhesive No. | | | | | | | | | | |
|---|---|---|---|---|---|---|---|---|---|---|---|
| Component | 23 | 24 | 25 | 26 | 27 | 28 | 29 | 30 | 31 | 32 | 33 |
| (7) Peeling strength | 360 | 360 | 360 | 355 | 350 | 190 | 360 | 360 | 350 | 340 | 160 |

TABLE 6-continued

| | | Adhesive No. | | | | | | | | | | |
|---|---|---|---|---|---|---|---|---|---|---|---|---|
| Component | | 23 | 24 | 25 | 26 | 27 | 28 | 29 | 30 | 31 | 32 | 33 |
| (8) Transfer of adhesive (at room temperature) g/25 mm | 1 day after | X | Δ | ◉ | ◉ | ◉ | ◉ | Δ | ◉ | ◉ | ◉ | ◉ |
| | 30 days after | X | Δ | ◉ | ◉ | ◉ | ◉ | Δ | ◉ | ◉ | ◉ | ◉ |
| (9) Transfer of adhesives (at 80° C.) | | X | X | ○ | ◉ | ◉ | ◉ | X | ○ | ◉ | ◉ | ◉ |

(7) Peeling strength: the masking member was attached to the surface of the steel panel coated with paint by contact with the adhesive layer of the masking member, and after one day, peeling strength (180°) was measured at 20° C.

(8) Transfer of adhesive (at room temperature): the masking member was attached to the surface of the steel panel coated with paint by contacting with the adhesive layer of the masking member, and said test piece was kept at 20° C. for one day or at room temperature for 30 days. Then, the masking member was peeled from the steel panel and transfer of the adhesive to the steel panel was observed.

(9) Transfer of adhesive (at 80° C.): The masking member was attached to the surface of the steel panel coated with paint by contacting with the adhesive layer of the masking member and said test piece was kept at room temperature for one day and then at 80° C. for 1 hour. Then the masking member was peeled from the steel panel and transfer of the adhesive to the steel panel was observed.

◉ : no transfer
○ : slight transfer
Δ : fair transfer
X : remarkable transfer

EXAMPLE 4

Two kinds of the water-soluble polymer were respectively mixed in 100 weight parts of emulsion of copolymer (51.9 weight % of solid content) consisting of 100 weight parts of butyl rubber latex (50 weight % of solid content), 3 weight parts of talc, and 1 weight part of propylene glycol as shown in Table 7.

TABLE 7

| | Adhesive No. | | | | | | | | | | | (weight part) |
|---|---|---|---|---|---|---|---|---|---|---|---|---|
| Component | 34 | 35 | 36 | 37 | 38 | 39 | 40 | 41 | 42 | 43 | 44 | |
| Emulsion-type adhesive | 100 | 100 | 100 | 100 | 100 | 100 | 100 | 100 | 100 | 100 | 100 | |
| Gelatine | — | 0.01 | 0.052 | 5 | 10 | 20 | — | — | — | — | — | |
| Sodium alginate | — | — | — | — | — | — | 0.01 | 0.052 | 5 | 10 | 20 | |

The resulting emulsion-type adhesives were respectively coated on a surface of the panel of the polystyrene foam as a base in amount of 100 g/m² and said adhesive layer was dried to manufacture a masking member. The results of the tests of said masking member are shown in Table 8.

TABLE 8

| | | Adhesive No. | | | | | | | | | | |
|---|---|---|---|---|---|---|---|---|---|---|---|---|
| | | 34 | 35 | 36 | 37 | 38 | 39 | 40 | 41 | 42 | 43 | 44 |
| (1) Transfer of adhesive after thermal aging | 1 day after | X | Δ | ◉ | ◉ | ◉ | ◉ | Δ | ◉ | ◉ | ◉ | ◉ |
| | 1 month after | X | Δ | ◉ | ◉ | ◉ | ◉ | Δ | ◉ | ◉ | ◉ | ◉ |
| | 3 months after | X | X | ○ | ◉ | ◉ | ◉ | X | ◉ | ◉ | ◉ | ◉ |
| | 6 months after | X | X | ○ | ◉ | ◉ | ◉ | X | ○ | ◉ | ◉ | ◉ |

(10) Transfer of the adhesive after thermal aging: the masking member was attached to the surface of the steel panel coated with paint by contacting with the adhesive layer of the masking member, and said test piece was given thermal aging at 40° C. for 1 day, 1 month, 3 months, or 6 months. Then the masking member was peeled from the steel panel and transfer of the adhesive to the steel panel was observed.

◉ : no transfer
○ : slight transfer
Δ : fair transfer
X : remarkable transfer

EXAMPLE 5

Adhesive No. 15 and Adhesive No. 17 were selected in this example, and foamed closed cell polystyrene panels having various densities as shown in Table 9 were used as bases. Said adhesives No. 15 and No. 17 were respectively coated on surfaces of said bases in amount of 50 g/m² and said adhesive layers were dried to manufacture masking members as shown in Table 9.

TABLE 9

| Masking member | Adhesive | Density (g/l) |
| --- | --- | --- |
| A | No. 15 | 12.0 |
| B | " | 12.5 |
| C | " | 13.0 |
| D | " | 15.0 |
| E | " | 20.0 |
| F | " | 25.0 |
| G | " | 30.0 |
| H | " | 40.0 |
| I | " | 45.0 |
| J | " | 50.0 |
| K | " | 50.5 |
| L | No. 17 | 12.0 |
| M | " | 12.5 |
| N | " | 13.0 |
| O | " | 15.0 |
| P | " | 20.0 |
| Q | " | 25.0 |
| R | " | 30.0 |
| S | " | 40.0 |
| T | " | 45.0 |
| U | " | 50.0 |
| V | " | 50.5 |

Masking members in Table 9 were respectively attached to surfaces of steel panels by contacting with adhesive layers of masking members, and after one day, said masking members were stripped by a hook. Easiness of hooking for each masking member and break of each masking member when said masking member is stripped were observed and shown in Table 10.

TABLE 10

| Masking member | Easiness of hooking | Break of masking member |
| --- | --- | --- |
| A | Easy | Slightly |
| B | " | No |
| C | " | " |
| D | " | " |
| E | " | " |
| F | " | " |
| G | " | " |
| H | " | " |
| I | " | " |
| J | " | " |
| K | A little difficult | " |
| L | Easy | Slightly |
| M | " | No |
| N | " | " |
| O | " | " |
| P | " | " |
| Q | " | " |
| R | " | " |
| S | " | " |
| T | " | " |
| U | " | " |
| V | A little difficult | " |

As shown in Table 10, masking members K and V having a density more than 50 g/l were a little difficult to be hooked, and masking members A and L having a density less than 12.5 g/l were broken when they were stripped by the hook and pieces of broken masking members remained on surfaces of steel panels.

We claim:

1. A masking member consisting essentially of a molded foamed closed cell polystyrene base having a density from about 12.5 to about 50 g/l and an adhesive layer formed on a surface of said polystyrene base by coating said surface of said base with a composition consisting essentially of an emulsion-type adhesive in which a water-soluble polymer is mixed in an amount in the range from about 0.1 to about 20% by weight of the weight of said emulsion-type adhesive.

2. The masking member of claim 1, wherein said emulsion-type adhesive is an acrylic emulsion.

3. The masking member of claim 1, wherein said emulsion-type adhesive is a natural rubber latex.

4. The masking member of claim 1, wherein said water-soluble polymer is a polyvinylalcohol.

5. The masking member of claim 1, wherein said water-soluble polymer is a gelatine.

6. The masking member of claim 1, wherein said masking member is used in coating proces of automobile.

* * * * *